(12) United States Patent
Byrne et al.

(10) Patent No.: US 8,483,760 B2
(45) Date of Patent: Jul. 9, 2013

(54) BASESTATION FOR CELLULAR COMMUNICATIONS SYSTEM

(75) Inventors: Richard Byrne, Thatcham (GB); Andrea Giustina, Milan (IT)

(73) Assignee: Ubiquisys Limited, Swindon (GB)

( * ) Notice: Subject to any disclaimer, the term of this patent is extended or adjusted under 35 U.S.C. 154(b) by 867 days.

(21) Appl. No.: 11/801,419

(22) Filed: May 8, 2007

(65) Prior Publication Data

US 2008/0207269 A1 Aug. 28, 2008

(30) Foreign Application Priority Data

Feb. 23, 2007 (GB) .................................. 0703603.1

(51) Int. Cl.
*H04M 1/00* (2006.01)
(52) U.S. Cl.
USPC ...................................... 455/561; 455/414.3
(58) Field of Classification Search
USPC ................ 455/90.1–90.3, 403, 550.1–575.9; 379/419–440
See application file for complete search history.

(56) References Cited

U.S. PATENT DOCUMENTS

| | | | |
|---|---|---|---|
| 5,438,608 A | 8/1995 | Kojima | |
| 5,778,322 A | 7/1998 | Rydbeck | |
| 5,794,157 A | 8/1998 | Haartsen | |
| 5,915,219 A | 6/1999 | Poyhonen | |
| 6,014,563 A | 1/2000 | Szabo | |
| 6,101,388 A | 8/2000 | Keshavachar | |
| 6,236,859 B1 | 5/2001 | Morper | |
| 6,556,842 B1 | 4/2003 | Ericsson | |
| 6,615,035 B1 | 9/2003 | Lucidarme et al. | |
| 6,842,462 B1 | 1/2005 | Ramjee et al. | |
| 6,901,061 B1 | 5/2005 | Joo et al. | |
| 7,103,040 B2 | 9/2006 | Aalbers et al. | |
| 7,167,707 B1 | 1/2007 | Gazzard et al. | |
| 7,463,887 B2 | 12/2008 | Roberts et al. | |
| 7,471,655 B2 | 12/2008 | Gallagher et al. | |
| 7,477,920 B2 | 1/2009 | Scheinert et al. | |
| 7,483,702 B2 | 1/2009 | Yeo et al. | |
| 7,606,190 B2 | 10/2009 | Markovic et al. | |
| 7,729,697 B2 | 6/2010 | Scheinert et al. | |
| 2001/0012319 A1* | 8/2001 | Foley ........................... 375/222 |

(Continued)

FOREIGN PATENT DOCUMENTS

| | | |
|---|---|---|
| DE | 19633925 | 3/1998 |
| EP | 1 519 613 | 3/1995 |

(Continued)

OTHER PUBLICATIONS

International Search Report and Written Opinion dated Jun. 5, 2008 for corresponding International Application No. PCT/GB2008/000346.

(Continued)

*Primary Examiner* — Kashif Siddiqui
(74) *Attorney, Agent, or Firm* — Weaver Austin Villeneuve & Sampson LLP

(57) ABSTRACT

A basestation for a cellular communications system includes back-to-back software stacks for terminating messages from a mobile station intended for the core network, and for recreating the messages in a form suitable for transmission to the core network, and further for terminating messages from the core network intended for a mobile station, and for recreating the messages in a form suitable for transmission to the mobile station.

16 Claims, 12 Drawing Sheets

U.S. PATENT DOCUMENTS

| | | | |
|---|---|---|---|
| 2001/0044305 A1 | 11/2001 | Reddy et al. | |
| 2002/0123348 A1 | 9/2002 | Willars et al. | |
| 2002/0191561 A1 | 12/2002 | Chen et al. | |
| 2002/0197992 A1 | 12/2002 | Nizri et al. | |
| 2003/0119489 A1 | 6/2003 | Mohammed | |
| 2004/0017786 A1 | 1/2004 | Shively | |
| 2004/0148279 A1* | 7/2004 | Peleg | 707/3 |
| 2004/0204097 A1 | 10/2004 | Scheinert et al. | |
| 2004/0224684 A1 | 11/2004 | Dorsey et al. | |
| 2005/0005174 A1* | 1/2005 | Connors | 713/202 |
| 2005/0037766 A1 | 2/2005 | Hans et al. | |
| 2005/0107083 A1 | 5/2005 | Rager et al. | |
| 2005/0114853 A1* | 5/2005 | Glider et al. | 717/170 |
| 2005/0239453 A1 | 10/2005 | Vikberg et al. | |
| 2006/0052085 A1 | 3/2006 | Rodriguez et al. | |
| 2007/0054668 A1 | 3/2007 | Scheinert et al. | |
| 2008/0003988 A1* | 1/2008 | Richardson | 455/414.3 |
| 2008/0123833 A1* | 5/2008 | Hara | 379/219 |
| 2008/0304439 A1 | 12/2008 | Keevill | |
| 2010/0081413 A1 | 4/2010 | Bernard et al. | |
| 2010/0190495 A1 | 7/2010 | Keevill | |
| 2010/0227645 A1 | 9/2010 | Keevill | |

FOREIGN PATENT DOCUMENTS

| | | | |
|---|---|---|---|
| EP | 1 032 236 | | 8/2000 |
| EP | 1244319 | | 9/2002 |
| EP | 1 286 561 | | 2/2003 |
| EP | 1 351 530 | | 10/2003 |
| EP | 1 681 804 | | 7/2006 |
| EP | 1244319 A | | 6/2008 |
| GB | 2355885 | | 5/2001 |
| GB | 2416965 | | 2/2006 |
| GB | 2416965 A | * | 2/2006 |
| GB | 2416965 A | | 2/2006 |
| JP | A H10-191421 | | 7/1998 |
| JP | 10271223 | | 10/1998 |
| JP | 10271223 A | * | 10/1998 |
| JP | A 2002-218528 | | 8/2002 |
| JP | 2005-109570 | | 4/2005 |
| JP | A 2005-109570 | | 4/2005 |
| WO | WO 95/08902 | | 3/1995 |
| WO | WO 97/50274 | | 12/1997 |
| WO | WO 01/45335 | | 6/2001 |
| WO | WO 01/45335 A1 | | 6/2001 |
| WO | WO 01/93617 | | 12/2001 |
| WO | WO 02/054820 | | 7/2002 |
| WO | WO 02/093811 | | 11/2002 |
| WO | WO 03/061177 | | 7/2003 |
| WO | WO 03/084096 | | 10/2003 |
| WO | WO 03/085992 | | 10/2003 |
| WO | WO 03/090013 | | 10/2003 |
| WO | 2004040938 | | 5/2004 |
| WO | WO/2004040938 | | 5/2004 |
| WO | WO2004/086788 | | 10/2004 |
| WO | WO 2005/015917 A2 | | 2/2005 |
| WO | WO 2005/057968 | | 6/2005 |
| WO | WO 2005/079087 | | 8/2005 |
| WO | WO 2005/112410 | | 11/2005 |
| WO | WO 2005/114918 | | 12/2005 |
| WO | WO 2005/114920 | | 12/2005 |
| WO | WO 2006/005999 | | 1/2006 |
| WO | WO 2007/015068 | | 2/2007 |

OTHER PUBLICATIONS

United Kingdom Search Report dated Jul. 18, 2007, for related GB Application No. 0703603.1 1 page.
United Kingdom Search Report dated Oct. 31, 2007, for related GB Application No. 0703603.1 1 page.
U.S. Non-final Office dated Apr. 2, 2010, U.S. Appl. No. 11/664,360.
U.S. Restriction Requirement dated Jan. 26, 2010, U.S. Appl. No. 11/664,360.
Digital Cellular Communications Systems (Phase 2+), ETSI Standards, Jun. 2005.
Johansson et al., "Mobile advantage wireless office—a digital wireless office system for TDMA/136 networks", 1999.
PCT Search report and Written Opinion of Application No. PCT/GB2006/002824, dated Feb. 28, 2007.
PCT Search Report and Written Opinion of Application No. PCT/GB2008/000346 dated Jun. 5, 2008.
Examination Report dated Sep. 12, 2008 for related European Patent Application No. 06 765 153.9-2412.
United Kingdom Search Report dated Jul. 18, 2007, for related GB Application No. 0703603.1.
United Kingdom Search Report dated Oct. 31, 2007, for related GB Application No. 0703603.1.
U.S. Final Office Action dated Apr. 19, 2011, U.S. Appl. No. 12/752,900.
Final Office Action dated Apr. 15, 2011, U.S. Appl. No. 12/752,908.
CN Office Action dated Sep. 27, 2010, Application No. 200680036331.4.
CN Office Action dated May 25, 2011, Application No. 200680036331.4.
JP Office Action dated Sep. 22, 2011, Application No. 2008-524579.
U.S. Non-final Office Action dated Aug. 2, 2010, U.S. Appl. No. 12/752,900.
U.S. Non-final Office Action dated Aug. 5, 2010, U.S. Appl. No. 12/752,908.
JP Second Office Action dated Apr. 16, 2012, Application No. 2008-524579.
JP Office Action dated Feb. 10, 2012, Application No. 2009-550747.
U.S. Final Office Action dated Dec. 27, 2010, U.S. Appl. No. 11/664,360.
Japanese Office Action dated Apr. 16, 2012, JP Application No. 2008-524579.
Chinese Office Action dated Jul. 3, 2012, CN Application No. 200880012619.7.
Chinese Office Action dated Jul. 20, 2012, CN Application No. 200680036331.4.
Japanese First Office Action dated Sep. 22, 2011, JP Application No. 2008-524579.
European Examination Report dated Sep. 24, 2012 for EP Application No. 06 765 142.2.

* cited by examiner

BASESTATION FOR CELLULAR COMMUNICATIONS SYSTEM

This invention relates to a basestation for use in a cellular telecommunications system, and in particular to a basestation for use as a femtocell basestation. A traditional cellular telecommunications system includes a number of basestations, each serving a part of the total coverage area of the system, these areas being termed cells. Each basestation is connected to the core network of the system, typically over a wired connection. A user of a wireless communications device, located in one of these cells, is able to establish wireless communications with the relevant basestation, and the traffic is passed over the wired connection to the core network, where it can be routed as required.

It has been suggested that, in order to increase the capacity of cellular telecommunications systems, femtocell basestations can additionally be provided. It has been suggested that a femtocell basestation could be obtained by a customer of the mobile network operator, and located within that customer's premises, which may for example be a home or a relatively small office. The femtocell basestation could then be connected to the core network of the cellular telecommunications system over the customer's existing broadband internet connection. In this case, a user of a suitably registered wireless communications device (which may for example be the customer's own conventional cellular wireless communications device), when it is located within the relatively small coverage area of the basestation (this area being termed a femtocell), is then able to establish wireless communications with the relevant femtocell basestation, and the traffic is passed over the broadband internet connection to the core network, where it can be routed as required.

It is known that, in some cases, certain operations require relatively large numbers of messages to be transferred between the basestation and the core network, even in a conventional cellular communications system. In addition, in use of the femtocell basestation as described above, traffic that is intended to be uploaded from the registered wireless communications device to a device that is connected to the internet, or is intended to be downloaded to the registered wireless communications device from a device that is connected to the internet, is passed through the core network of the cellular communications system, placing an additional burden on the core network.

According to a first aspect of the present invention, there is provided a basestation, having software that allows the basestation to terminate and/or interrogate messages sent from a mobile device that are intended for the network, and/or allows the basestation to terminate and/or interrogate messages sent from the network that are intended for the mobile device.

This has the advantage that, in some situations, the number of messages transferred between the basestation and the network can be reduced. Further, the basestation operator can provide additional services to the user.

For a better understanding of the present invention, and to show how it may be put into effect, reference will now be made, by way of example, to the accompanying drawings, in which.

Figure 1:
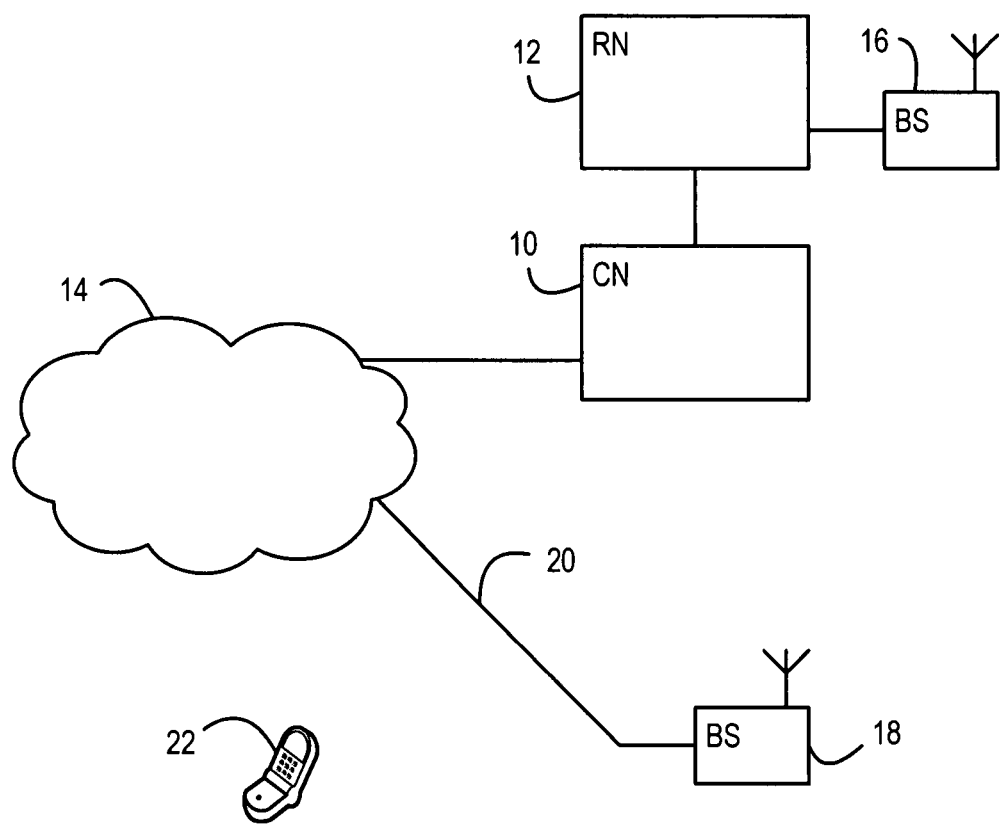
FIG. 1 is a block schematic diagram of a part of a cellular wireless communications network.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a basestation (BS) 16 connected thereto. As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells.

FIG. 1 also shows an additional basestation 18 that can be used to provide coverage over a very small area, for example within a single home or office building. This is referred to as a femtocell basestation (FBS). The femtocell basestation 18 is connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestation 16.

As mentioned above, the macrocell basestations provide coverage to the whole of the intended service area including the location of the femtocell basestation 18 and the location of the mobile phone 22 while it is in the coverage area of the femtocell basestation 18. However, the network is configured such that, when a mobile device that is allowed to be registered with the femtocell basestation 18 is within the coverage area of the femtocell basestation 18, then it will preferentially establish a connection with the femtocell basestation 18 rather than with the macrolayer basestation 16.

Figure 2:
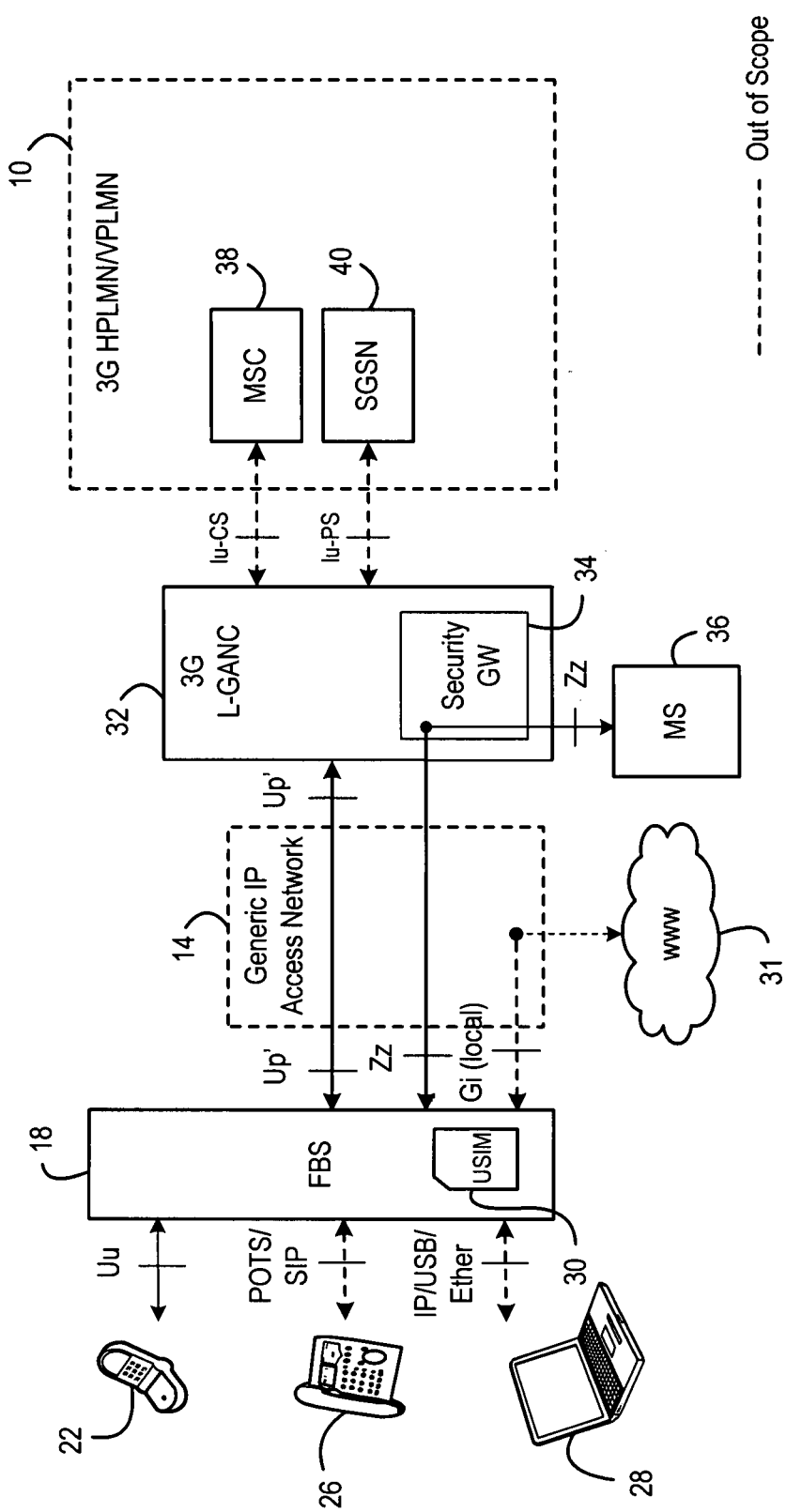
FIG. 2 shows the functional architecture of a part of the network illustrated in FIG. 1.

FIG. 2 shows the functional architecture of a part of the network illustrated in FIG. 1. Specifically, the mobile phone, or user equipment (UE), 22 is shown, having a connection into the femtocell basestation (FBS) 18 over a Uu radio interface. Other devices can also be used to connect to the FBS 18, such as a POTS or SIP phone 26, which can connect over a POTS or SIP interface, as appropriate, or a PC 28, which can for example connect over IP, or over USB, or over WiFi, or over an Ethernet connection.

The FBS 18 includes a USIM 30, which can take the form of a SIM card as is conventional, or can contain the required data in any removable or non-removable module. The USIM 30 allows the FBS 18 to identify itself to the mobile network operator's core network as if it were itself a mobile device, and provides suitable authorization and encryption functionality.

The FBS 18 has a connection over the generic IP access network 14 to the internet 31.

In this case, the FBS 18 uses the UMA (Unlicensed Mobile Access) protocol for backhaul, and has a Up' interface over the generic IP access network 14 to a 3G L-GANC (Generic Access Network Controller) 32.

The FBS 18 is also able to establish a Zz interface over the generic IP access network 14, through a security gateway 34 in the Generic Access Network Controller 32 to a management system (MS) 36. The management system 36 is operated by the mobile network operator, and supports the operation of the femtocell basestations, such as the FBS 18, within the network.

The 3G L-GANC (Generic Access Network Controller) 32 is then connected to the core network 10 of the mobile network operator. The network may be the Home Public Land Mobile Network (HPLMN) or the Visited Public Land Mobile Network (VPLMN) defined in the 3G specifications. In this illustrated case, the network includes both a Mobile Switching Center (MSC) 38 for circuit switched data, to which the GANC 32 may establish a Iu-CS interface, and a Serving GPRS Support Node (SGSN) 40 for packet switched data, to which the GANC 32 may establish a Iu-PS interface.

Figure 3:
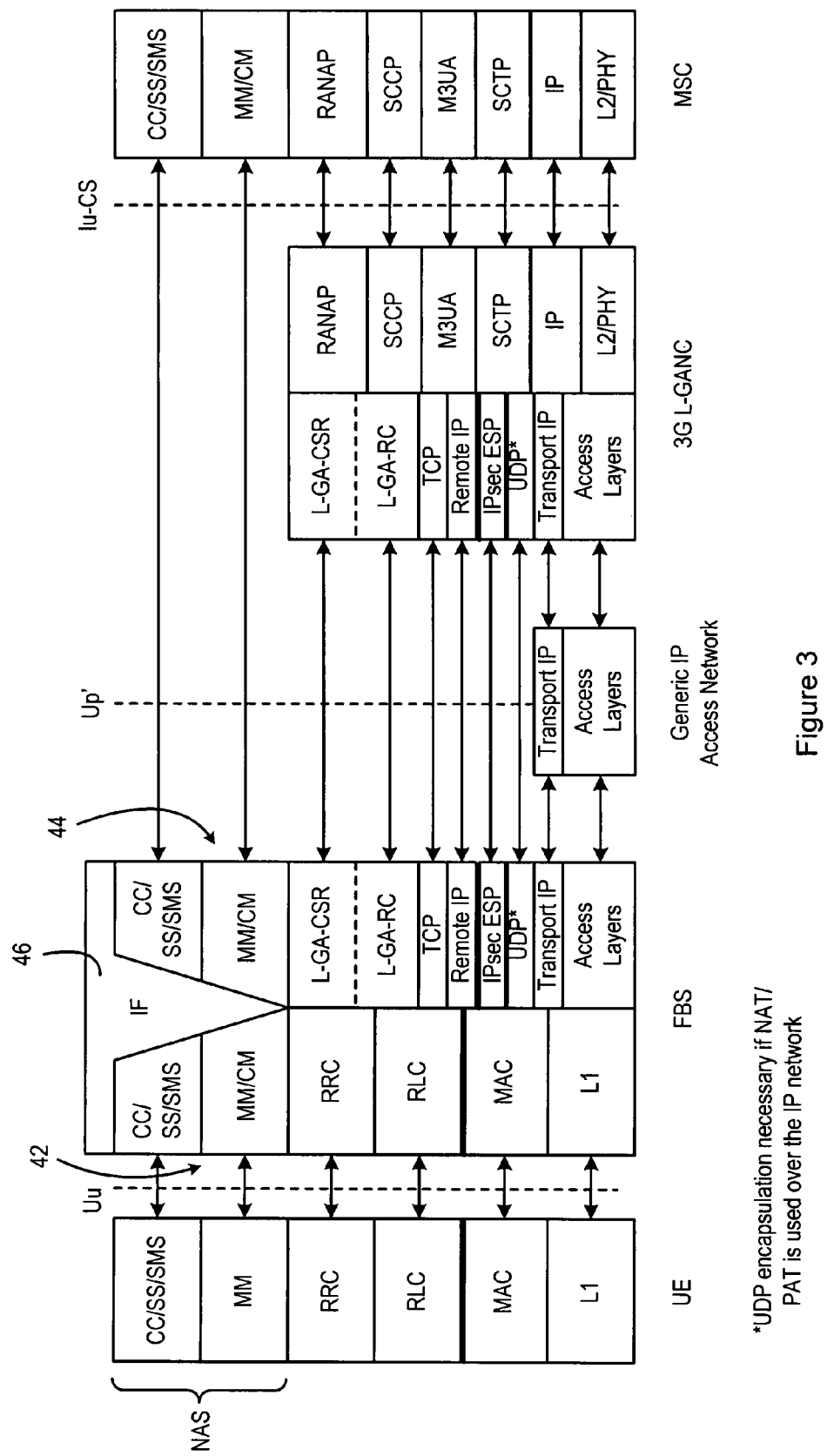
FIG. 3 is a protocol stack diagram, illustrating software operating on nodes in the part of the network shown in FIG. 2 in an embodiment of the invention.

FIG. 3 illustrates the circuit switched domain control plane protocol stacks that are provided in the various network nodes, namely the UE 22, the FBS 18, nodes of the IP access network 14, the 3G L-GANC 32 and the MSC 38.

As is well known, the WCDMA protocol structure is divided vertically into an Access Stratum (AS) and a Non-Access Stratum (NAS). The Access Stratum (AS) includes the Layer 1 (L1) protocol, the Media Access Control (MAC) protocol, the Radio Link Control (RLC) protocol, and the Radio Resource Control (RRC) protocol. It can be seen that these are terminated in the FBS 18, and interworked into the relevant UMA protocol layers for transmission over the IP access network 14 to the GANC 32, where they are terminated again, and interworked into the relevant protocols for transmission to the MSC 38.

By contrast, the UE 22 and the MSC 38 would be able to communicate directly with each other using the Non-Access Stratum (NAS) protocols, which may include the Call Control (CC) protocol, the Supplementary Services (SS) protocol, the Short Message Service (SMS) protocol, the Mobility Management (MM) protocol, and the Connection Management (CM) protocol, for example.

However, in accordance with an aspect of the present invention, the FBS 18 includes software 42 for terminating messages from the UE 22 in the protocols of the Non-Access Stratum that are intended for the MSC 38, and also includes software 44 for terminating messages from the MSC 38 in the protocols of the Non-Access Stratum that are intended for the UE 22. The FBS 18 also includes intelligence function (IF) software 46 for providing an interworking or relay function between the software 42 and the software 44.

Thus, in this embodiment of the invention, and others, the software in the FBS 18 includes software for interworking between the wireless communications over the Uu interface on the one hand and the communications using the UMA protocol with the 3G L-GANC on the other hand.

However, the software in the FBS 18 also includes back-to-back NAS software stacks. These stacks allow messages in the NAS protocol layers, that have been sent from the UE and would conventionally be expected to be received in the MSC, to be terminated in the FBS 18. Messages can then be recreated for onward transmission to the MSC, either in the same form or with modification of one or more parameter value, or the messages can instead be handled in a different way, for example by transmitting a message over the internet without passing through the MSC. Similarly, the software in the FBS 18 also allows messages in the NAS protocol layers, that have been sent from the MSC and would conventionally be expected to be received in the UE, to be terminated in the FBS 18. Messages can then be recreated for onward transmission to the UE, either in the same form or with modification of one or more parameter value, or the messages can instead be handled in a different way.

The operation of the software 42, 44, 46 in the FBS 18 will be described in more detail below.

Figure 4:
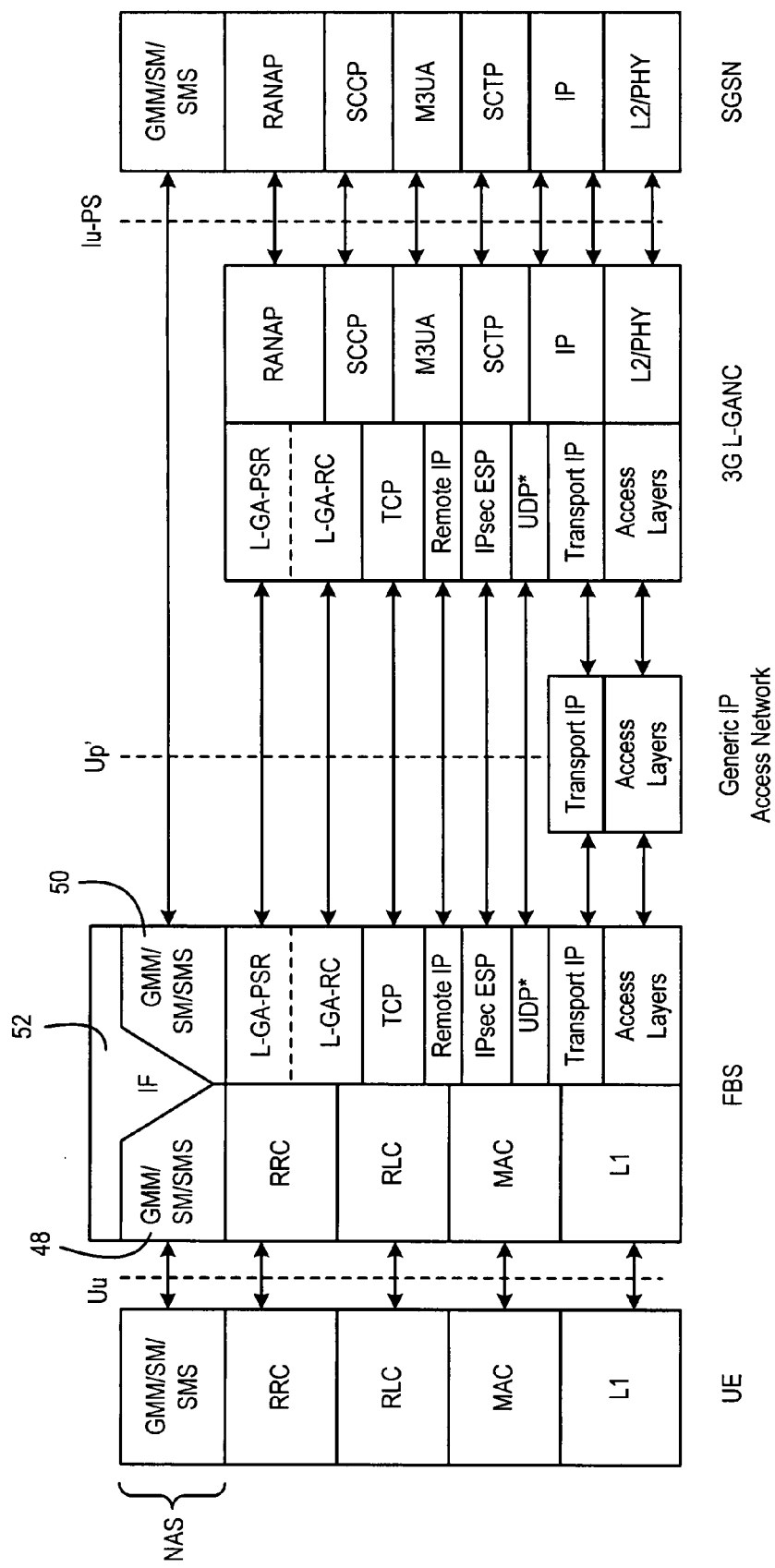
FIG. 4 is a further protocol stack diagram, illustrating software operating on nodes in the part of the network shown in FIG. 2 in an embodiment of the invention.

FIG. 4 illustrates the packet switched domain control plane protocol stacks that are provided in the various network nodes, namely the UE 22, the FBS 18, nodes of the IP access network 14, the 3G L-GANC 32 and the SGSN 40.

As before, the protocol structure is divided vertically into an Access Stratum (AS) and a Non-Access Stratum (NAS), and the Access Stratum (AS) includes the Layer 1 (L1) protocol, the Media Access Control (MAC) protocol, the Radio Link Control (RLC) protocol, and the Radio Resource Control (RRC) protocol. It can be seen that these are terminated in the FBS 18, and interworked into the relevant UMA protocol layers for transmission over the IP access network 14 to the GANC 32, where they are terminated again, and interworked into the relevant protocols for transmission to the SGSN 40.

By contrast, the UE 22 and the SGSN 40 would be able to communicate directly with each other using the Non-Access Stratum (NAS) protocols, which may include the GPRS Mobility Management (GMM) protocol, the Session Management (SM) protocol, and the Short Message Service (SMS) protocol, for example.

However, in accordance with an aspect of the present invention, the FBS 18 includes software 48 for terminating messages from the UE 22 in the protocols of the Non-Access Stratum that are intended for the SGSN 40, and also includes software 50 for terminating messages from the SGSN 40 in the protocols of the Non-Access Stratum that are intended for the UE 22. The FBS 18 also includes intelligence function (IF) software 52 for providing an interworking or relay function between the software 48 and the software 50.

Thus, in these embodiments, the FBS 18 supports the relevant protocols to make the UE 22 believe that it is working into a 3G UMTS network. Towards the network, the FBS 18 supports the UMA protocols to make the GANC 32 believe that it is communicating with a UMA client and to make the MSC 38 (or SGSN 40) believe that it is communicating with a 3G UE. The intelligence function 46, 52 can be programmed to pass information between the 3G and UMA stacks transparently e.g. relaying so that the relevant 3G UE protocols (NAS) communicate transparently through the FBS with the 3G MSC. Alternatively the intelligence function 46, 52 can be programmed to terminate all or of some of the protocols as appropriate. The terminated protocols are then interworked. It is also possible to program the intelligence function 46, 52 to interrogate the protocols then relaying some parts and interworking other of the same protocol.

Figure 5:
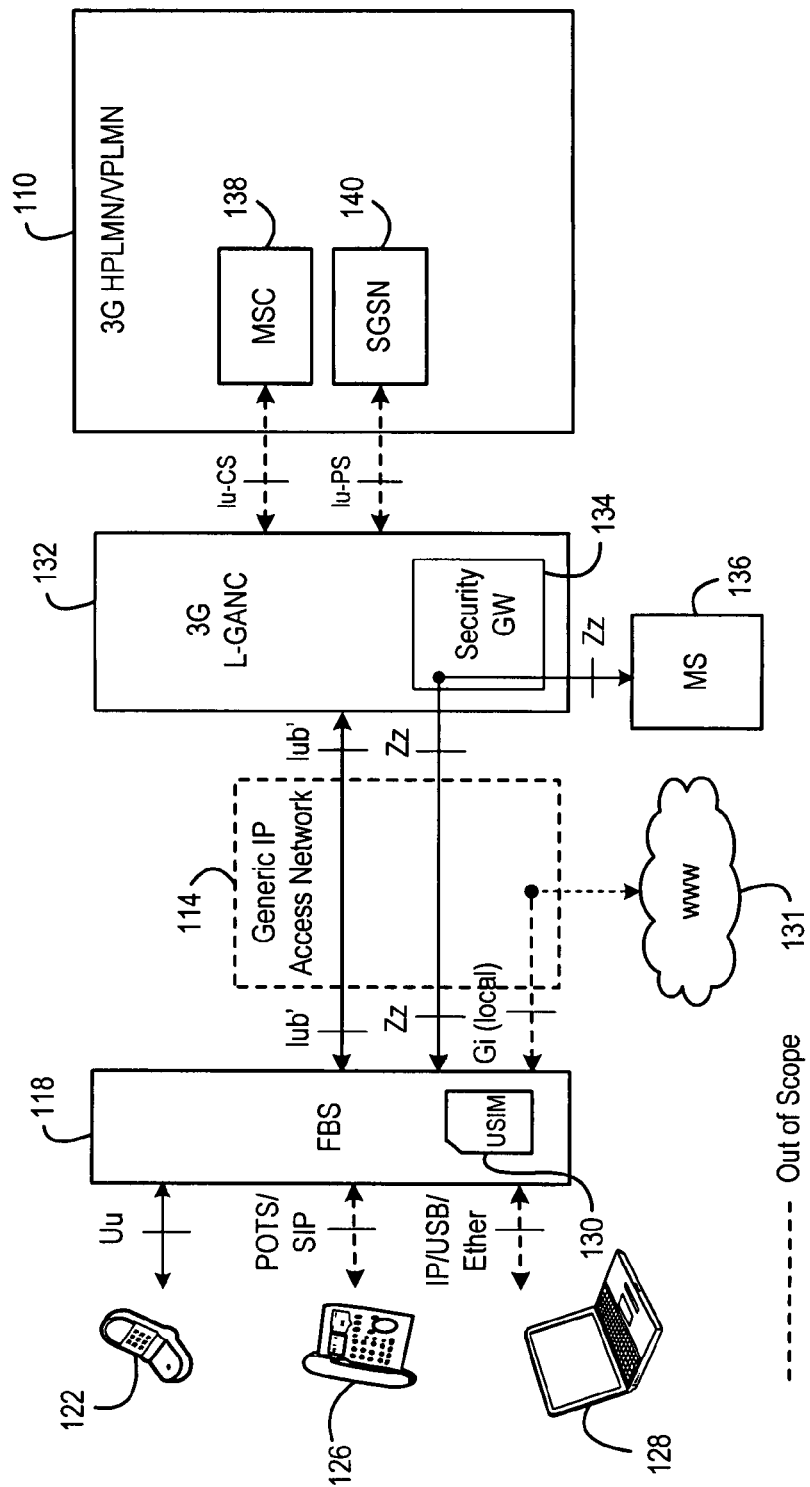
FIG. 5 shows the functional architecture of a part of the network illustrated in FIG. 1, in an alternative embodiment.

FIG. 5 shows the functional architecture of a part of the network illustrated in FIG. 1, in an alternative embodiment. Specifically, a mobile phone, or user equipment (UE), 122 is shown, having a connection into the femtocell basestation (FBS) 118 over a Uu radio interface. Other devices can also be used to connect to the FBS 118, such as a POTS or SIP phone 126, which can connect over a POTS or SIP interface, as appropriate, or a PC 128, which can connect over IP, or over USB, or over an Ethernet connection.

The FBS 118 includes a USIM 130, which can take the form of a SIM card as is conventional, or can contain the required data in any removable or non-removable module. The USIM 130 allows the FBS 118 to identify itself to the mobile network operator's core network as if it were itself a mobile device, and provides suitable authorization and encryption functionality.

The FBS 118 has a connection over the generic IP access network 114 to the internet 131.

In this case, the FBS 118 has a slightly modified Iub interface, referred to as an Iub' interface, a 3G RNC (Radio Network Controller) 132.

The FBS 118 is also able to establish a Zz interface over the generic IP access network 114, through a security gateway 134 in the Radio Network Controller 132 to a management system (MS) 136. The management system 136 is operated by the mobile network operator, and supports the operation of the femtocell basestations, such as the FBS 118, within the network.

The Radio Network Controller 132 is then connected to the core network 110 of the mobile network operator. The network may be the Home Public Land Mobile Network (HPLMN) or the Visited Public Land Mobile Network (VPLMN) defined in the 3G specifications. In this illustrated case, the network includes both a Mobile Switching Center (MSC) 138 for circuit switched data, to which the RNC 132 may establish a Iu-CS interface, and a Serving GPRS Support Node (SGSN) 140 for packet switched data, to which the RNC 32 may establish a Iu-PS interface.

Figure 6:
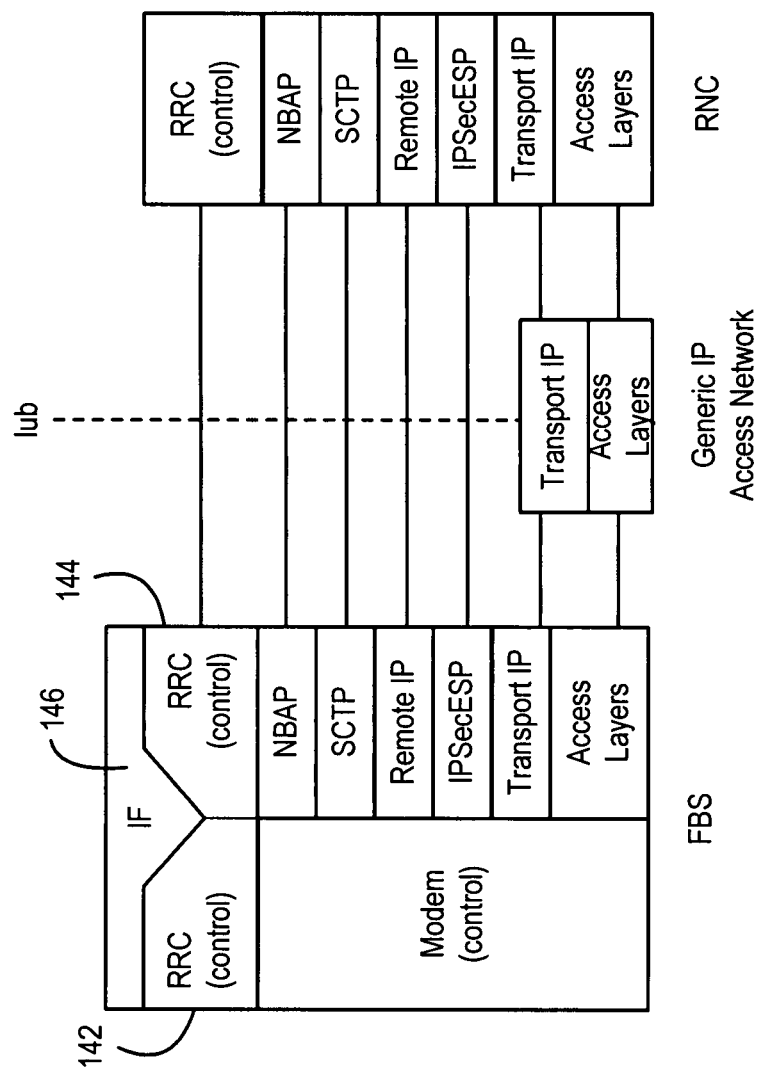
FIG. 6 is a protocol stack diagram, illustrating software operating on nodes in the part of the network shown in FIG. 5 in an embodiment of the invention.

FIG. 6 illustrates the Iub control plane protocol architecture, showing the protocol stacks that are provided in the FBS 118, nodes of the IP access network 114, and the RNC 132. Specifically, the FBS 118 includes software 142 for terminating Radio Resource Control (RRC) messages from the UE 122 that are intended for the RNC 132, and also includes software 144 for terminating RRC messages from the RNC 132 that are intended for the UE 122. The FBS 118 also includes intelligence function (IF) software 146 for providing an interworking or relay function between the software 142 and the software 144.

Figure 7:
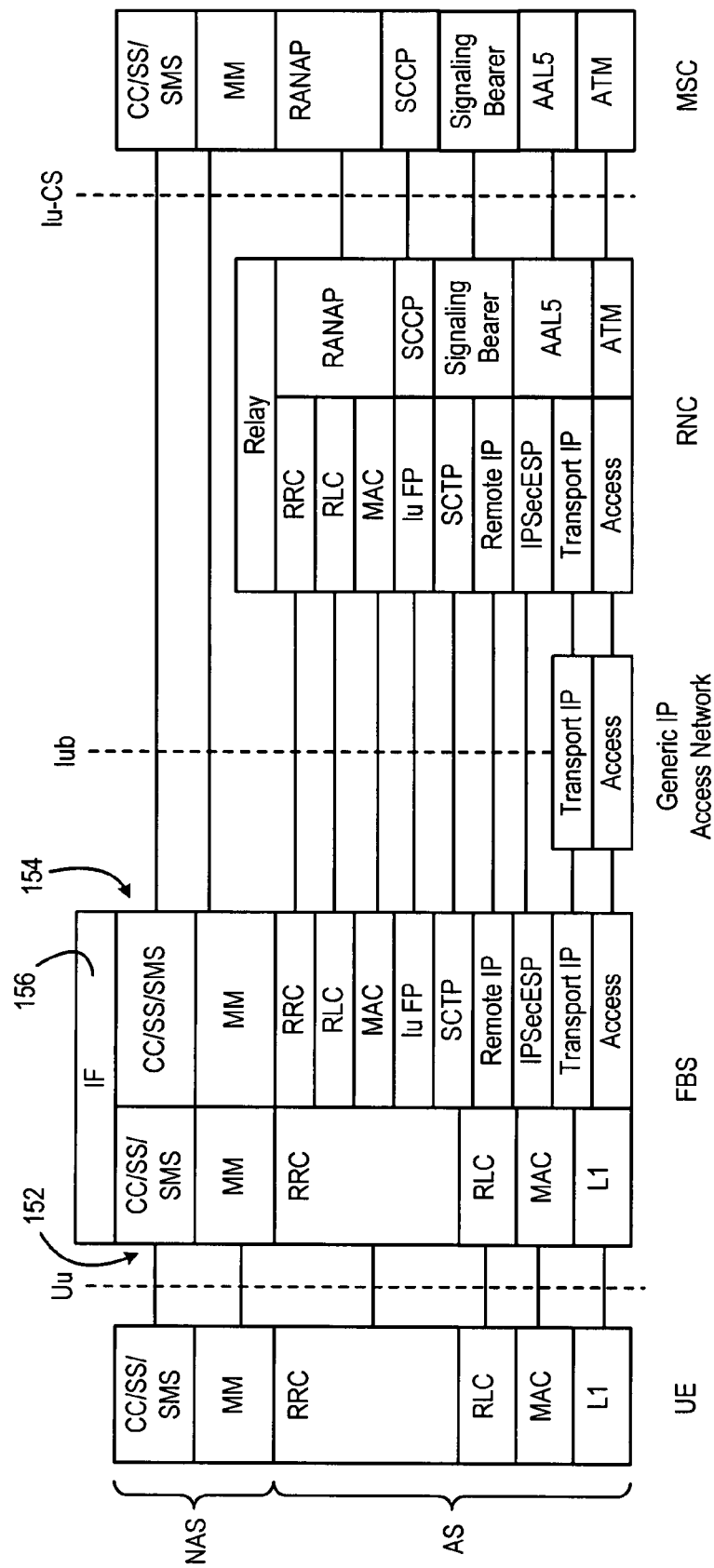
FIG. 7 is a further protocol stack diagram, illustrating software operating on nodes in the part of the network shown in FIG. 5 in an embodiment of the invention.

FIG. 7 illustrates the Iu-CS control plane protocol architecture, showing the protocol stacks that are provided in the various network nodes, namely the UE 122, the FBS 118, nodes of the IP access network 114, the RNC 132 and the MSC 138.

As discussed above, the WCDMA protocol structure is divided vertically into an Access Stratum (AS) and a Non-Access Stratum (NAS). The Access Stratum (AS) includes the Layer 1 (L1) protocol, the Media Access Control (MAC) protocol, the Radio Link Control (RLC) protocol, and the Radio Resource Control (RRC) protocol. It can be seen that these are terminated in the FBS 118, and transmitted over the IP access network 114 to the RNC 132, where they are terminated again, and interworked into the relevant protocols for transmission to the MSC 138.

By contrast, the UE 122 and the MSC 138 would be able to communicate directly with each other using the Non-Access Stratum (NAS) protocols, which may include the Call Control (CC) protocol, the Supplementary Services (SS) protocol, the Short Message Service (SMS) protocol, the Mobility Management (MM) protocol, and the Connection Management (CM) protocol, for example.

However, in accordance with an aspect of the present invention, the FBS 118 includes software 152 for terminating messages from the UE 122 in the protocols of the Non-Access Stratum that are intended for the MSC 138, and also includes software 154 for terminating messages from the MSC 138 in the protocols of the Non-Access Stratum that are intended for the UE 122. The FBS 118 also includes intelligence function (IF) software 156 for providing an interworking or relay function between the software 152 and the software 154.

The operation of the software 152, 154, 156 in the FBS 118 will be described in more detail below.

Figure 8:
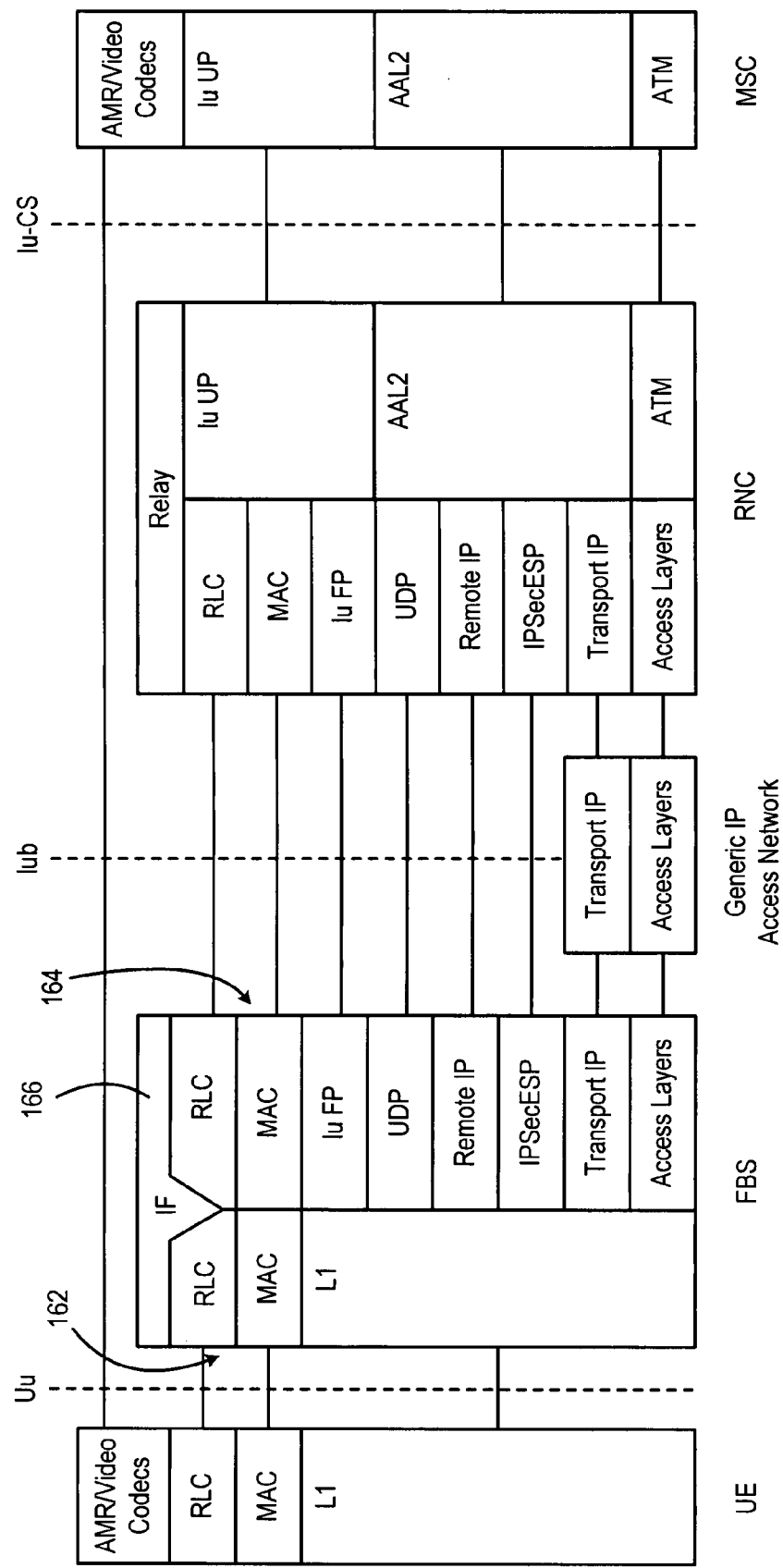
FIG. 8 is a further protocol stack diagram, illustrating software operating on nodes in the part of the network shown in FIG. 5 in an embodiment of the invention.

FIG. 8 illustrates the Iu-CS control plane protocol architecture, showing the protocol stacks that are provided in the various network nodes, namely the UE 122, the FBS 118, nodes of the IP access network 114, the RNC 132 and the MSC 138.

The UE 122 and the RNC 132 would be able to communicate directly with each other using the Media Access Control (MAC) protocol and the Radio Link Control (RLC) protocol. However, in accordance with an aspect of the present invention, the FBS 118 includes software 162 for terminating messages from the UE 122 in the MAC and RLC protocols that are intended for the RNC 132, and also includes software 164 for terminating messages from the RNC 132 in the MAC and RLC protocols that are intended for the UE 122. The FBS 118 also includes intelligence function (IF) software 166 for providing an interworking or relay function between the software 162 and the software 164.

Figure 9:
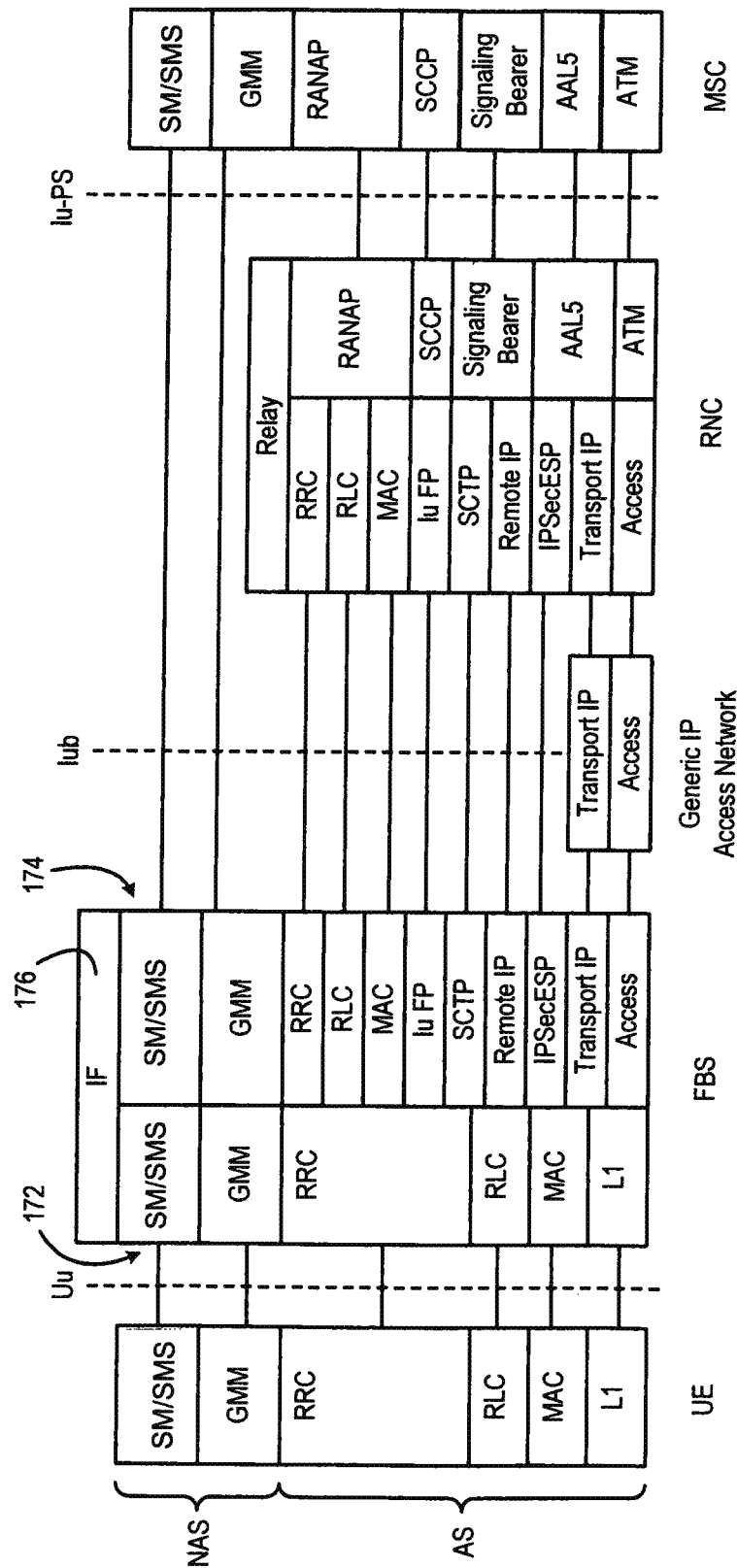
FIG. 9 is a further protocol stack diagram, illustrating software operating on nodes in the part of the network shown in FIG. 5 in an embodiment of the invention.

FIG. 9 illustrates the packet switched domain control plane protocol stacks that are provided in the various network nodes, namely the UE 122, the FBS 118, nodes of the IP access network 114, the RNC 132 and the SGSN 140.

As before, the protocol structure is divided vertically into an Access Stratum (AS) and a Non-Access Stratum (NAS), and the Access Stratum (AS) includes the Layer 1 (L1) protocol, the Media Access Control (MAC) protocol, the Radio Link Control (RLC) protocol, and the Radio Resource Control (RRC) protocol. It can be seen that these are terminated in the FBS 118, and transmitted over the IP access network 114 to the RNC 132, where they are terminated again, and interworked into the relevant protocols for transmission to the SGSN 140.

By contrast, the UE 122 and the SGSN 140 would be able to communicate directly with each other using the Non-Access Stratum (NAS) protocols, which may include the GPRS Mobility Management (GMM) protocol, the Session Management (SM) protocol, and the Short Message Service (SMS) protocol, for example.

However, in accordance with an aspect of the present invention, the FBS 118 includes software 172 for terminating messages from the UE 122 in the protocols of the Non-Access Stratum that are intended for the SGSN 140, and also includes software 174 for terminating messages from the SGSN 140 in the protocols of the Non-Access Stratum that are intended for the UE 122. The FBS 118 also includes intelligence function (IF) software 176 for providing an interworking or relay function between the software 172 and the software 174.

Figure 10:
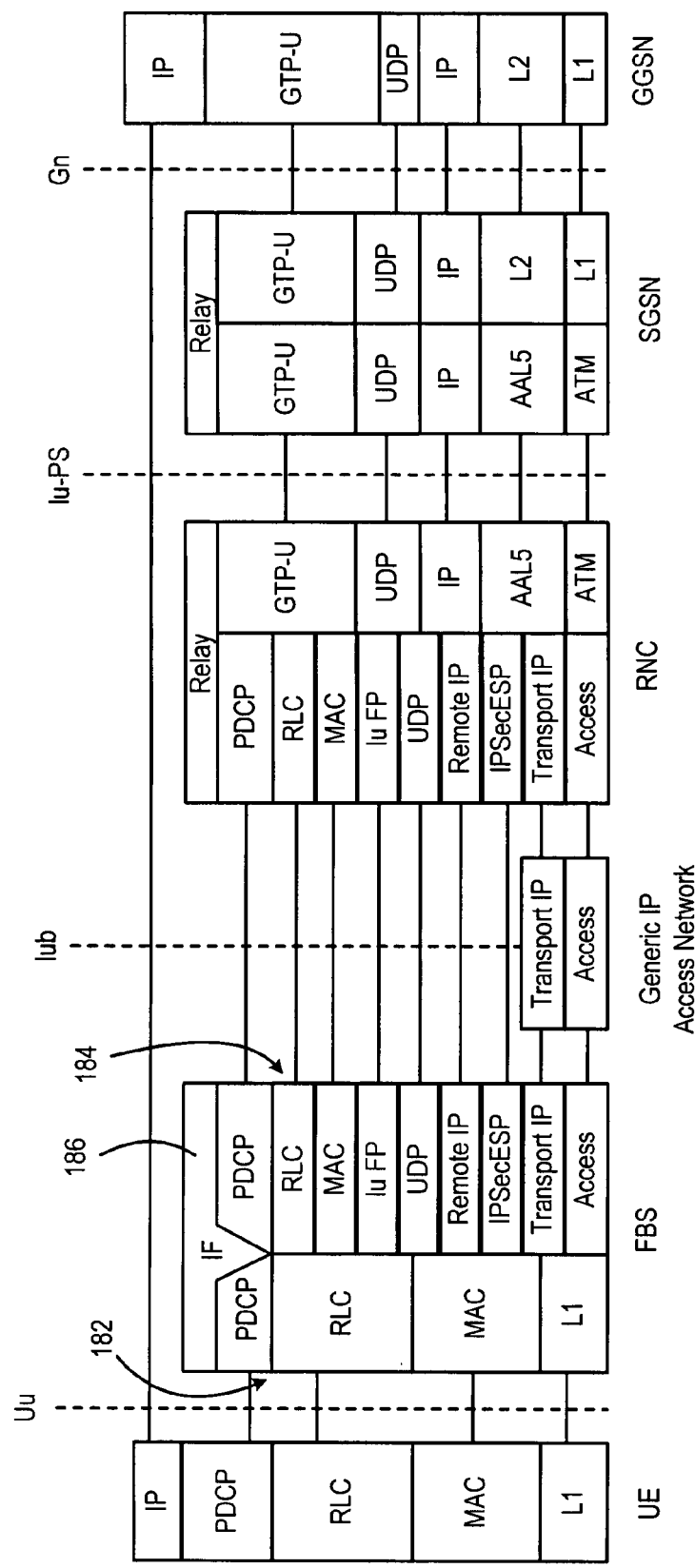
FIG. 10 is a further protocol stack diagram, illustrating software operating on nodes in the part of the network shown in FIG. 5 in an embodiment of the invention.

FIG. 10 illustrates the Iu-PS control plane protocol architecture, showing the protocol stacks that are provided in the various network nodes, namely the UE 122, the FBS 118, nodes of the IP access network 114, the RNC 132, the SGSN 140, and the GGSN (not shown in FIG. 5), to which the SGSN 140 is connected.

The UE 122 and the RNC 132 would be able to communicate directly with each other using the Media Access Control (MAC) protocol, the Radio Link Control (RLC) protocol, and the Packet Data Convergence Protocol (PDCP). However, in accordance with an aspect of the present invention, the FBS 118 includes software 182 for terminating messages from the UE 122 in the MAC, RLC and PDCP protocols that are intended for the RNC 132, and also includes software 184 for terminating messages from the RNC 132 in the MAC, RLC and PDCP protocols that are intended for the UE 122. The FBS 118 also includes intelligence function (IF) software 186 for providing an interworking or relay function between the software 182 and the software 184.

There are thus described various embodiments of the invention, in which the topmost protocol layers are terminated in the femtocell basestation. However, in other embodiments of the invention, less of the protocols are terminated in the femtocell basestation, while still allowing the basestation to perform useful functions.

Figure 11:
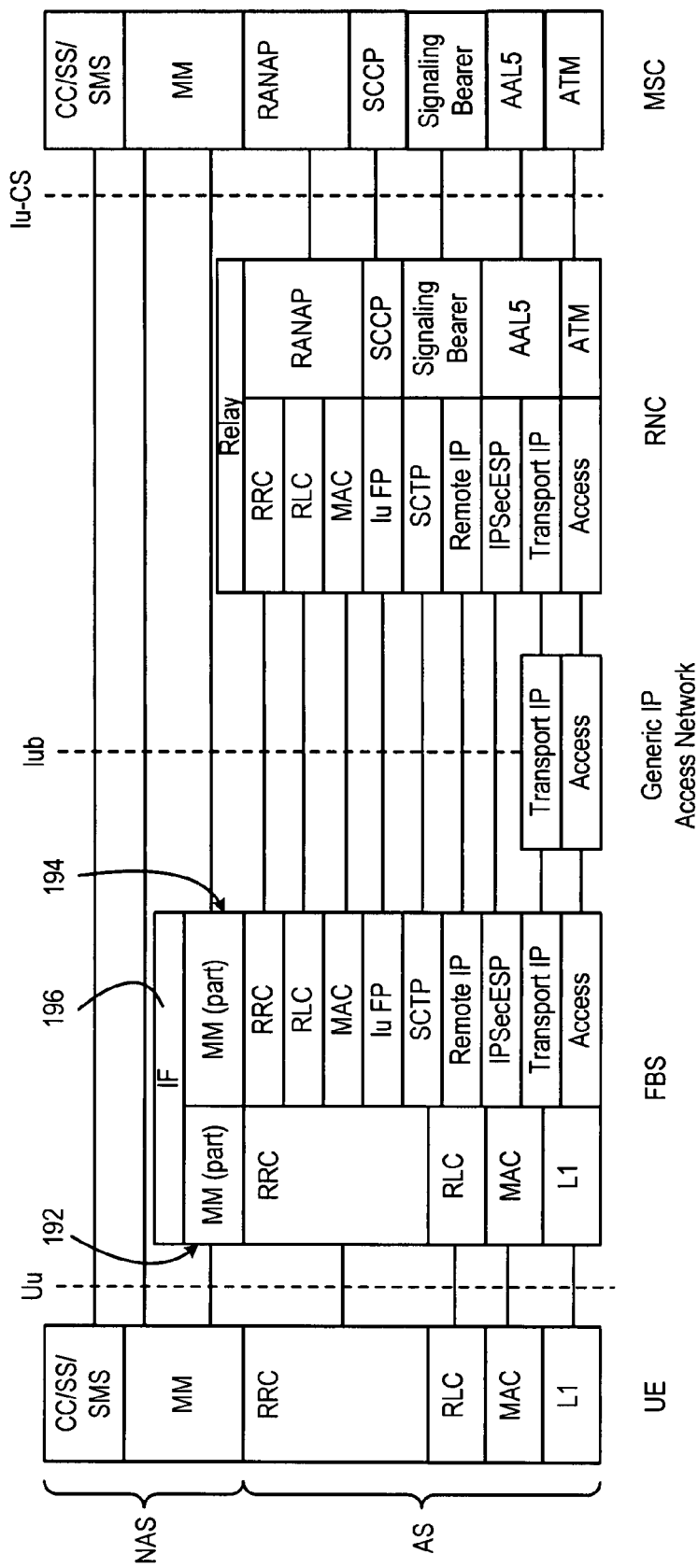
FIG. 11 is a further protocol stack diagram, illustrating software operating on nodes in the part of the network shown in FIG. 5 in an embodiment of the invention.

For an example of this, FIG. 11 is similar to FIG. 7, but illustrates an alternative form of the Iu-CS control plane protocol architecture, showing the protocol stacks that are provided in the various network nodes, namely the UE 122, the FBS 118, nodes of the IP access network 114, the RNC 132 and the MSC 138.

As discussed above, the WCDMA protocol structure is divided vertically into an Access Stratum (AS) and a Non-Access Stratum (NAS). The Access Stratum (AS) includes the Layer 1 (L1) protocol, the Media Access Control (MAC) protocol, the Radio Link Control (RLC) protocol, and the Radio Resource Control (RRC) protocol. It can be seen that these are terminated in the FBS 118, and transmitted over the IP access network 114 to the RNC 132, where they are terminated again, and interworked into the relevant protocols for transmission to the MSC 138.

In addition, the UE 122 and the MSC 138 communicate directly with each other using some of the Non-Access Stratum (NAS) protocols, including the Call Control (CC) protocol, the Supplementary Services (SS) protocol, the Short Message Service (SMS) protocol, and parts of the Mobility Management (MM) protocol.

However, in accordance with an aspect of the present invention, the FBS 118 includes software 192 for terminating messages from the UE 122 in a part of the Mobility Management (MM) protocol that are intended for the MSC 138, and also includes software 194 for terminating messages from the MSC 138 in that part of the Mobility Management (MM) protocol that are intended for the UE 122. The FBS 118 also includes intelligence function (IF) software 196 for providing an interworking or relay function between the software 192 and the software 194.

Terminating these messages in the part of the Mobility Management (MM) protocol allows the FBS 118 to obtain the IMSI of the UE 122. For example, this allows the FBS to determine which UE is attempting to register with the FBS 118, so that registration requests by non-allowed UEs can be terminated without core network involvement. Also, this allows for data from the UE 122 to be transferred over the internet 131 rather than over the core network, if this is more convenient.

Thus, in these embodiments, the FBS 118 supports the relevant protocols to make the UE 122 believe that it is working into a 3G UMTS network. Towards the network, the FBS 118 supports the relevant protocols to make the RNC 132 and the MSC 138 (or SGSN 140) believe that they are communicating with a 3G UE. The intelligence function 146, 156, 166, 176, 186, 196 can be programmed to pass information between the stacks transparently e.g. relaying so that the relevant 3G UE protocols (NAS) communicate transparently through the FBS with the 3G MSC. Alternatively the intelligence function can be programmed to terminate all or of some of the protocols as appropriate. The terminated protocols are then interworked. It is also possible to program the intelligence function to interrogate the protocols, then relaying some parts and interworking other of the same protocol.

It will be apparent that the same principle can be applied in other situations. For example, the femtocell basestation can be connected into a 2G core network (for example based on GPRS), rather than a 3G core network, as described here. In this case, the software in the femtocell basestation also provides interworking between a 2G core network and a 3G air-interface.

The operation of the intelligence function (IF) software and the illustrated protocol stacks in the FBS 18 will be described in more detail below. In the following description, reference will be made to the embodiment of FIG. 3 above, and thus reference will be made to the UE 22, the FBS 18, and its software 42, 44, 46. However, these references are simply for illustration, and it should be appreciated that the same description applies to the other illustrated embodiments, and to other embodiments within the scope of the invention.

As described above, software 42 is provided in the FBS 18 for terminating messages from the UE 22 in the protocols of the Non-Access Stratum that are intended for the relevant node of the core network 10. A signalling connection is therefore established between the UE 22 and the FBS 18. This allows the UE 22 to communicate through the FBS 18 without needing to adapt its transmissions in any way, compared to the situation in which it communicates through any other basestation.

Similarly, software 44 is provided in the FBS 18 for terminating messages from the relevant node of the core network 10 in the protocols of the Non-Access Stratum that are intended for the UE 22. A signalling connection is therefore established between the node of the core network 10 and the FBS 18. This allows the core network node to communicate through the FBS 18 without needing to adapt its transmissions in any way, compared to the situation in which it communicates with a UE through any other basestation.

As described above, the FBS 18 also includes software 46 for providing an interworking or relay function between the software 42 and the software 44. This software can determine how to handle the received messages, terminated by the software 42 or the software 44, based on the message type and/or the message content.

For example, the software 46 can be such that some messages are effectively simply retransmitted in the same form.

In other cases, the software 46 can be such that certain messages need not be retransmitted. For example, wireless communication protocols typically allow the UE to request retransmission of messages that it was not able to receive correctly. In a conventional network, such messages are transmitted from the UE to the core network node and cause the message to be retransmitted from the core network node, and therefore use core network resources. In this case, such messages can be terminated by the software 42 and read by the software 46, and the retransmission can take place from the FBS 18, without requiring any traffic to be sent to the core network and without any use of core network resources.

As another example, use of the software 46 enables Layer 3 (and above) control in the FBS 18 of all CS and PS calls.

As another example, use of the software 46 enables local registration and call attempts to be accepted or rejected locally without having to go over to the core network. That is, local registration and call attempt messages can be terminated by the software 42, and read by the software 46, which can also make a decision without requiring core network involvement.

As another example, use of the software 46 enables local services without core network involvement.

As another example, use of the software 46 enables local internet offload. That is, a message sent from the UE 22, and intended for a recipient accessible over the internet, can be terminated by the software 42 and read by the software 46. The software 46 can then decide to route this message over the internet 30 directly, as illustrated in FIG. 2, without requiring core network involvement.

More generally, the software 46 may allow the FBS 18 to operate in a termination mode, in which it may terminate any layer of the protocol on either side of the double stack interface, that is, in the software 42 or the software 44, as appropriate.

To explain this, it needs to be understood that each layer of the protocol stack has messages associated with it. These messages are only understood within the layer. Usually, the messages are point to point, which requires the protocol to be terminated in the receiving node. Termination means for instance that the node has call states, e.g. a null state waiting for an incoming SETUP message. Once received, the node moves to a call present state. This state can notice that the traffic channel requested in the setup message is not available. If this is the case, it sends a RELEASE COMPLETE message and enters the null state. Otherwise it sends a CALL PROCEEDING message to the network indicating the call has been accepted. Thus, when a protocol is terminated it can interact with its peer layer. Also, when the protocol is terminated, it can then interwork with other protocols. For example, a node may be provided with 3G UE CS signalling on one interface towards one network entity, with SIP on another interface towards a different network entity. The CS protocol uses information elements IE whilst the other is text based.

In embodiments of the invention, the basestation 18 is provided with software that allows it to terminate various protocol layers, as illustrated above, even where the sending node intends the messages to be sent transparently through the basestation (for example from the mobile device to the network, or from the network to the mobile device). Terminating the protocol provides more scope to add features and services.

The basestation may then:
support relevant call states;
relay the protocol messages;
map messages to the same protocol messages;
map (interwork) protocol messages to other protocols (e.g CS-SIP);
subsume/discard protocol messages (location updates);
convert information (e.g. converting between the cell-id and the geographical coordinates of the cell);
provide local services (without passing on the messages, for example, to the core network);
make decisions based on the protocol message;
initiate messages without instruction from the core network;
map between different codecs (eg AMR—G.711 PCM).

Additionally, the FBS 18 may only interrogate protocol messages, without supporting call states (for example by receiving a release message that would take the state from answered to clear). In the case of protocol interrogation, a decision can be made by the intelligence function software to change parts of the protocol message on the fly as it passes between the interfaces. No call states would be involved. Protocol interrogation is thus essentially an intelligent relaying function, which differs from a conventional relaying function in that, although the basestation merely passes the message on, it could potentially recognise the message, so that, if it was a release message, it could substitute another clearing cause within it.

In the interrogation mode the FBS can, depending on the protocol message, on either side of the dual stack interface:
relay the protocol messages;
map messages to the same protocol messages;
subsume/discard protocol messages (such as location updates);
alter information in a message (e.g. between cell-id and geographical coordinates).

Figure 12:
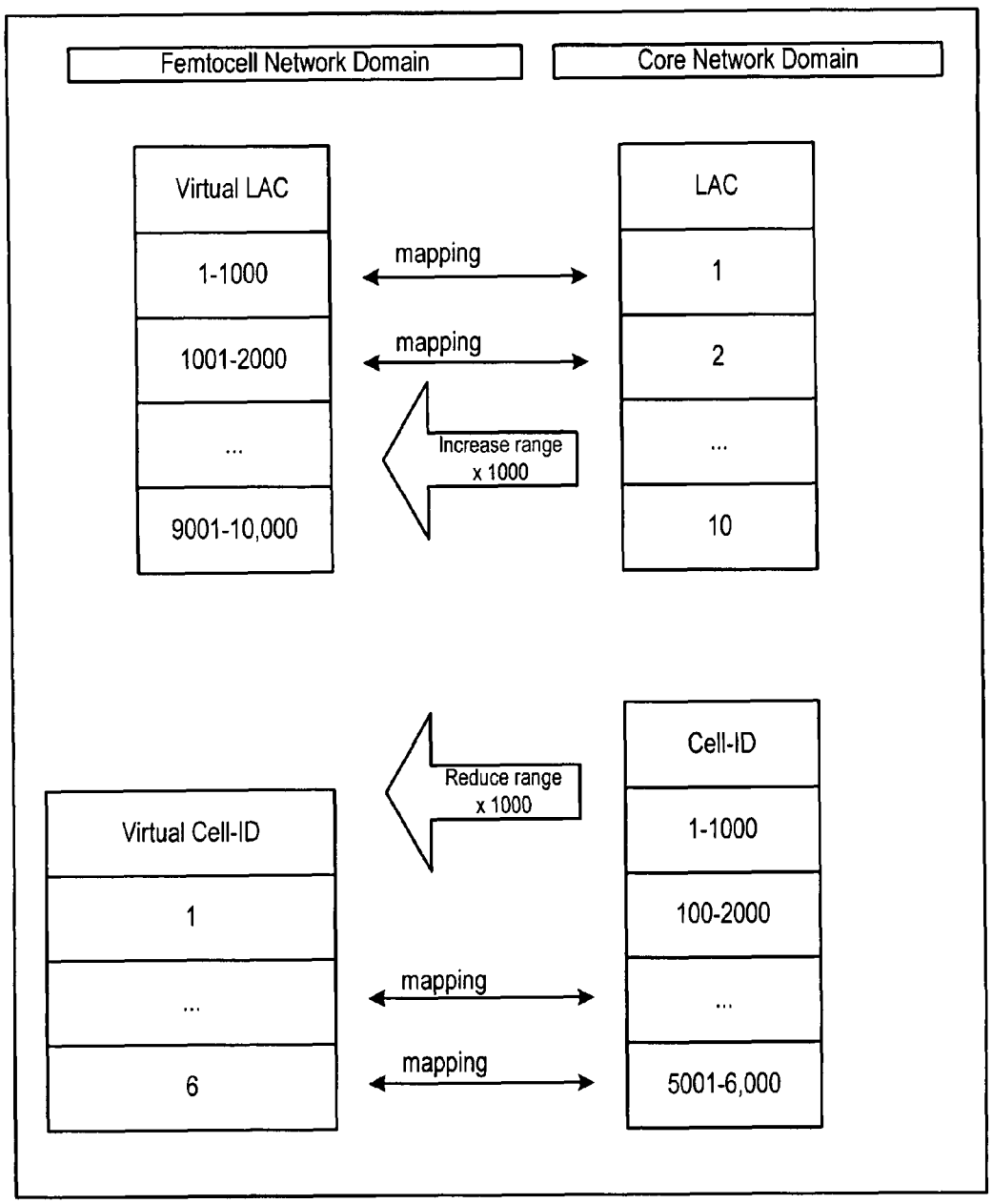
FIG. 12 illustrates a method in accordance with an aspect of the invention.

FIG. 12 illustrates a situation where the mapping functionality is used. This situation arises from the fact that the core network may for example allocate 10 Location Area Code (LAC) values (i.e. 1, 2, . . . , 10) and 6000 Cell-IDs (i.e. the values 1-6000) to the femtocell network (that is, a total of 60,000 unique combinations of LAC value and Cell-ID). However, to provide additional flexibility in its resource allocation, the femtocell management system may for example prefer to maintain these 60,000, by using just 6 Cell-IDs (i.e. 1, 2, . . . , 6), but 10,000 LAC values (i.e. the values 1-10,000).

This can be achieved by mapping the LAC values and Cell-IDs in the core network domain to virtual LAC values and Cell-IDs in the femtocell network domain. As shown in FIG. 12, the LAC values 1, 2, . . . , 10 in the core network domain are mapped to virtual LAC values 1-1000, 1001-2000, . . . , 9001-10,000 in the femtocell network domain, while Cell-IDs 1-1000, 1001-2000, . . . , 5001-6000 in the core network domain are mapped to virtual Cell-IDs 1, 2, . . . , 6 in the femtocell network domain For this scheme to work, it is necessary that LAC values and Cell-IDs in messages sent from the core network to the mobile devices should be mapped to the appropriate virtual LAC values and Cell-IDs, and that, conversely, virtual LAC values and Cell-IDs in messages sent to the core network from the mobile devices should be mapped to the appropriate LAC values and Cell-IDs.

This is achieved in the intelligence function software by termination of the relevant messages, removal of the values from the sending domain, and insertion of the values from the receiving domain, followed by retransmitting the messages in the appropriate protocol.

This therefore allows the messages to be sent, and correctly received, without the sending entity needing to know that the message has been terminated in the basestation.

The invention claimed is:

1. A basestation, for use in a cellular mobile communications system, the basestation having a wireless interface for connection with a mobile communications device, and having an interface for connection with a network of said cellular mobile communications system, wherein, in said cellular mobile communications system, the mobile communications device sends messages intended for the network and the network sends messages intended for the mobile communications device according to a standardized communications protocol, wherein the basestation comprises:

software for terminating first messages sent from the mobile communications device intended for the network, the first messages configured according to a standardized communications protocol, for recreating at least some of the first messages according to the standardized communications protocol, and for sending the recreated first messages to the network in response to at least some of the terminated first messages; and software for terminating second messages sent from the network intended for the mobile communications device, the second messages configured according to the standardized communications protocol, for recreating at least some of the second messages according to the standardized communications protocol, and for sending the recreated second messages to the mobile communications device in response to at least some of the terminated second messages;

wherein said software for terminating the first messages is configured to:

determine whether each first message can be routed directly over the internet, and, if so, to route the first message directly over the internet without involvement of the network, and to recreate the message in the first protocol and send the recreated first message to the network only if the message cannot be routed directly over the internet.

2. A basestation as claimed in claim 1, comprising:

software for terminating said messages sent from the mobile communications device intended for the network in accordance with a non-access stratum of the standardized communications protocol; and software for terminating said messages sent from the network intended for the mobile communications device in accordance with a non-access stratum of the standardized communications protocol.

3. A basestation as claimed in claim 1, comprising: back-to-back software stacks, for terminating protocol messages from a UE in a first protocol and recreating messages for onward transmission to the mobile network in said first protocol, and for terminating protocol messages from the mobile network in said first protocol and recreating messages for onward transmission to the UE in said first protocol.

4. A basestation as claimed in claim 3, wherein the software is adapted to recreate messages in said first protocol either in the same form or with modification of one or more parameter value.

5. A basestation as claimed in claim 3 or 4, wherein the back-to-back software stacks comprises NAS software layers.

6. A basestation as claimed in claim 1, comprising: back-to-back software stacks, for interrogating protocol messages sent from a UE in a first protocol and intended for onward transmission to the mobile network in said first protocol, and for interrogating protocol messages sent from the mobile network in said first protocol and intended for onward transmission to the UE in said first protocol.

7. A basestation as claimed in claim 6, wherein the software is adapted to modify said protocol messages before said onward transmission.

8. A basestation as claimed in claim 6 or 7, wherein the back-to-back software stacks comprises NAS software layers.

9. A basestation as claimed in claim 3, wherein the basestation further comprises software for determining an identity of a UE sending a message in the first protocol.

10. A basestation as claimed in claim 3, wherein the first protocol is a Mobility Management protocol, and wherein the basestation further comprises software for determining an identity of a UE sending a registration request message in the Mobility Management protocol, and for terminating the registration request if it determines that the UE is a non-allowed UE.

11. A basestation, for use in a cellular mobile communications system, the basestation having a wireless interface for connection with a mobile communications device, and having an interface for connection with a network of said cellular mobile communications system, wherein, in said cellular mobile communications system, the mobile communications device sends messages intended for the network and the network sends messages intended for the mobile communications device according to a standardized communications protocol, wherein the basestation comprises:

software for terminating first messages sent from the mobile communications device intended for the network, the first messages configured according to a standardized communications protocol, for recreating at least some of the first messages according to the standardized communications protocol, and for sending the recreated first messages to the network in response to at least some of the terminated first messages; and software for terminating second messages sent from the network intended for the mobile communications device, the second messages configured according to the standardized communications protocol, for recreating at least some of the second messages according to the standardized communications protocol, and for sending the recreated second messages to the mobile communications device in response to at least some of the terminated second messages;

wherein:

in response to first messages containing an identifier comprising at least one of a Location Area Code selected from a first range of Location Area Codes and a Cell-ID selected from a first range of Cell-IDs, the recreated first messages contain an identifier comprising at least one of a Location Area Code selected from a second range of Location Area Codes and a Cell-ID selected from a second range of Cell-IDs, and wherein:

in response to second messages containing an identifier comprising at least one of a Location Area Code selected from the second range of Location Area Codes and a Cell-ID selected from the second range of Cell-IDs, the recreated second messages contain an identifier comprising at least one of a Location Area Code selected from the first range of Location Area Codes and a Cell-ID selected from the first range of Cell-IDs.

12. A basestation as claimed in claim 11, wherein the first range of Location Area Codes contains more Location Area Codes than the second range of Location Area Codes.

13. A basestation as claimed in claim 11, wherein the first range of Cell-IDs contains fewer Cell-IDs than the second range of Cell-IDs.

14. A basestation, for use in a cellular mobile communications system, the basestation having a wireless interface for connection with a mobile communications device, and having an interface for connection with a network of said cellular mobile communications system, wherein, in said cellular mobile communications system, the mobile communications device sends messages intended for the network and the network sends messages intended for the mobile communications device according to a standardized communications protocol, wherein the basestation comprises:

software for terminating first messages sent from the mobile communications device intended for the network, the first messages configured according to a standardized communications protocol, for recreating at least some of the first messages according to the standardized communications protocol, and for sending the recreated first messages to the network in response to at least some of the terminated first messages; and software for terminating second messages sent from the network intended for the mobile communications device, the second messages configured according to the standardized communications protocol, for recreating at least some of the second messages according to the standardized communications protocol, and for sending the recreated second messages to the mobile communications device in response to at least some of the terminated second messages;

wherein the first messages contain a Location Area Code selected from a first range of Location Area Codes and a Cell-ID selected from a first range of Cell-IDs;

wherein the recreated first messages contain a Location Area Code selected from a second range of Location Area Codes and a Cell-ID selected from a second range of Cell-IDs;

wherein the second messages contain a Location Area Code selected from the second range of Location Area Codes and a Cell-ID selected from the second range of Cell-IDs;

wherein the recreated second messages contain a Location Area Code selected from the first range of Location Area Codes and a Cell-ID selected from the first range of Cell-IDs, and wherein the first range of Location Area Codes is mapped to the second range of Location Area Codes, and the first range of Cell-IDs is mapped to the second range of Cell-IDs.

15. A basestation, for use in a cellular mobile communications system, the basestation having a wireless interface for connection with a mobile communications device, and having an interface for connection with a network of said cellular mobile communications system, wherein, in said cellular mobile communications system, the mobile communications device sends messages intended for the network and the network sends messages intended for the mobile communications device according to a standardized communications protocol, wherein the basestation comprises:

software for terminating first messages sent from the mobile communications device intended for the network, the first messages configured according to a standardized communications protocol, for recreating at least some of the first messages according to the standardized communications protocol, and for sending the recreated first messages to the network in response to at least some of the terminated first messages; and software for terminating second messages sent from the network intended for the mobile communications device, the second messages configured according to the standardized communications protocol, for recreating at least some of the second messages according to the standardized communications protocol, and for sending the recreated second messages to the mobile communications device in response to at least some of the terminated second messages;

wherein the first messages contain a Location Area Code selected from a first range of Location Area Codes;

wherein the recreated first messages contain a Location Area Code selected from a second range of Location Area Codes;

wherein the second messages contain a Location Area Code selected from the second range of Location Area Codes;

wherein the recreated second messages contain a Location Area Code selected from the first range of Location Area Codes, and wherein the first range of Location Area Codes is mapped to the second range of Location Area Codes.

16. A basestation, for use in a cellular mobile communications system, the basestation having a wireless interface for connection with a mobile communications device, and having an interface for connection with a network of said cellular mobile communications system, wherein, in said cellular mobile communications system, the mobile communications device sends messages intended for the network and the network sends messages intended for the mobile communications device according to a standardized communications protocol, wherein the basestation comprises:

software for terminating first messages sent from the mobile communications device intended for the network, the first messages configured according to a standardized communications protocol, for recreating at least some of the first messages according to the standardized communications protocol, and for sending the recreated first messages to the network in response to at least some of the terminated first messages; and software for terminating second messages sent from the network intended for the mobile communications device, the second messages configured according to the standardized communications protocol, for recreating at least some of the second messages according to the standardized communications protocol, and for sending the recreated second messages to the mobile communications device in response to at least some of the terminated second messages;

wherein the first messages contain a Cell-ID selected from a first range of Cell-IDs; wherein the recreated first messages contain a Cell-ID selected from a second range of Cell-IDs;

wherein the second messages contain a Cell-ID selected from the second range of Cell-IDs;

wherein the recreated second messages contain a Cell-ID selected from the first range of Cell-IDs, wherein the first range of Cell-IDs is mapped to the second range of Cell-IDs.

* * * * *